(12) United States Patent
Kim et al.

(10) Patent No.: US 12,020,546 B2
(45) Date of Patent: Jun. 25, 2024

(54) COMMUNICATION METHOD BETWEEN HOST AND DEVICES IN ATM

(71) Applicant: Hyosung TNS INC., Seoul (KR)

(72) Inventors: Byung Ryong Kim, Incheon (KR); Jong Woo Kim, Seoul (KR); Yoon Kill Baek, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 0 days.

(21) Appl. No.: 18/359,877

(22) Filed: Jul. 27, 2023

(65) Prior Publication Data

US 2023/0368623 A1 Nov. 16, 2023

Related U.S. Application Data

(63) Continuation of application No. PCT/KR2022/001379, filed on Jan. 26, 2022.

(30) Foreign Application Priority Data

Feb. 3, 2021 (KR) .................. 10-2021-0015312

(51) Int. Cl.
*G07F 19/00* (2006.01)
*G06F 13/38* (2006.01)
*G06F 13/42* (2006.01)

(52) U.S. Cl.
CPC .......... *G07F 19/211* (2013.01); *G06F 13/385* (2013.01); *G06F 13/4282* (2013.01); *G06F 2213/0042* (2013.01)

(58) Field of Classification Search
CPC ... G07F 19/211; G06F 13/385; G06F 13/4282
(Continued)

(56) References Cited

U.S. PATENT DOCUMENTS 10,607,456 B1 * 3/2020 Benkreira .......... G06Q 20/4015
11,011,007 B2 * 5/2021 Nishimura .............. G07D 9/00
(Continued)

FOREIGN PATENT DOCUMENTS

JP 2015-056007 A 3/2015
JP 2017-520052 A 7/2017
(Continued)

OTHER PUBLICATIONS

International Search Report of PCT/KR2022/001379 Mailed on Jul. 4, 2022.

*Primary Examiner* — Ahshik Kim
(74) *Attorney, Agent, or Firm* — WTA Patents

(57) ABSTRACT

A method of communication between a host of an automated teller machine and a device. The process is performed as a result of sensor polling which the host periodically performs to check a state of a device. The process is simplified by employing an interrupt communication scheme in which an interrupt signal for notifying that a change of a sensor value occurs in the device is transmitted from a device to a host. This simplification reduces USB traffic that occurs during a process of communication between the host of the automated teller machine and the device, thereby reducing a load that is applied to a communication hardware chip of the automated teller machine. As a result, the frequency with which a communication failure occurs is decreased, thereby achieving the effect of providing support for seamless communication.

6 Claims, 5 Drawing Sheets

(58) Field of Classification Search
USPC .......................................................... 235/379
See application file for complete search history.

(56) References Cited

U.S. PATENT DOCUMENTS

| | | |
|---|---|---|
| 11,151,847 B2 * | 10/2021 | Candido De Lima Junior ........... G07F 19/207 |
| 2008/0027873 A1 * | 1/2008 | Ofir ........................ G06Q 20/10 705/73 |
| 2020/0065787 A1 * | 2/2020 | Kruczek .......... G06Q 20/40145 |
| 2020/0134987 A1 * | 4/2020 | Morgan ................ H04L 9/3236 |

FOREIGN PATENT DOCUMENTS

| KR | 10-0453262 B1 | 10/2004 |
|---|---|---|
| KR | 10-2008-0046780 A | 5/2008 |
| KR | 10-2008-0062610 A | 7/2008 |

\* cited by examiner

COMMUNICATION METHOD BETWEEN HOST AND DEVICES IN ATM

CROSS-REFERENCE TO RELATED APPLICATIONS

This is a bypass continuation of International PCT Application No. PCT/KR2022/001379, filed on Jan. 26, 2022, which claims priority to Republic of Korea Patent Application No. 10-2021-0015312, filed on Feb. 3, 2021, which are incorporated by reference herein in their entirety.

TECHNICAL FIELD

The present disclosure relates to a method of communication between a host of an automated teller machine and a device and, more particularly, to a method of a host of an automated teller machine and a device, the method being capable of simplifying a process of repeatedly transmitting and receiving the same signal between the host of the automated teller machine and the device, in association with setting-up of a scheme for communication between the host made up of a main CPU and a plurality of the devices that operate according to a control command of the host. The process has to be performed as a result of sensor polling which the host periodically performs to check a state of a device. The process is simplified by employing an interrupt communication scheme in which an interrupt signal for notifying that a change of a sensor value occurs in the device is transmitted from a device to a host. This simplification reduces USB traffic that occurs during a process of communication between the host of the automated teller machine and the device. As a result, the frequency with which a communication failure occurs is decreased, thereby achieving the effect of providing support for seamless communication.

BACKGROUND ART

Automated teller machines (ATM) have been introduced to provide improved convenience in financial transactions to customers of a financial institution. Usually, the ATM performs various tasks, such as cash and check depositing and withdrawal, bankbook update, remittance, and public utility bill payment.

In order to perform these tasks, the ATM includes various devices, such as a touch screen, a scanner, and a printer. Information is input from the customer through the touch screen, and the touch screen provides a menu and a transaction screen to the customer. The scanner scans customer information, such as a bankbook and a fingerprint. The printer prints transactional details and provides the transactional details to the customer.

These devices are connected to a host of the ATM through a universal serial bus (USB) cable in order to perform an operation and to transmit data. To this end, the ATM is configured to further include a USB port that supports a connection to a multiplicity of devices. For example, Korean Application Publication No. 10-2008-0046780 discloses an ATM that includes a voltage booster, a USB hub, and a USB port and a device connection structure in which power supply and data transmission are performed through one USB cable.

The host of the ATM has to always precisely check a real-time state of the device in order to perform seamless financial transactions. Accordingly, during data communication between the host, made up of a main CPU, of the ATM and each of the plurality of devices that operate according to a control command of the host, sensor polling for acquiring sensor information of the device is repeatedly performed at significantly short time intervals. As a result, a significant level of traffic occurs on a USB communication line over which a signal is transmitted between the host and the device.

Due to the traffic that always occurs in this manner, a significant load is applied to a communication H/W chip that is utilized during a process of USB communication between the host and the device. Accordingly, a H/W chip that complies with relatively high advanced-technology specifications is required. Thus, there is a problem in that manufacturing costs of the ATM is increased and that the frequency with which a communication failure occurs is increased.

SUMMARY

An object of the present disclosure, which is made to find a solution to the above-mentioned problem, is to provide a method of communication between a host of an automated teller machine and a device, the method being capable of simplifying a process of repeatedly transmitting and receiving the same signal between the host of the automated teller machine and the device, in association with setting-up of a scheme for communication between the host made up of a main CPU and a plurality of the devices that operate according to a control command of the host. The process has to be performed as a result of sensor polling which the host periodically performs to check a state of a device. The process is simplified by employing an interrupt communication scheme in which an interrupt signal for notifying that a change of a sensor value occurs in the device is transmitted from a device to a host. This simplification reduces USB traffic that occurs during a process of communication between the host of the automated teller machine and the device, thereby reducing a load that is applied to a communication H/W chip of the automated teller machine. As a result, the frequency with which a communication failure occurs is decreased, thereby achieving the effect of providing support for seamless communication.

In order to accomplish the above-mentioned object, according to an aspect of the present disclosure, there is provided a method of communication for transmission of data between a host in an automated teller machine, the host on which an application for conducting a financial transaction is installed and on which a device driver for driving a multiplicity of devices in which the financial transaction is conducted is installed, and each of the multiple of devices connected to the host through a USB communication line, wherein the device driver is configured in such a manner as to transmit a signal for requesting for sensor information of the device over the USB communication line, receive the sensor information from the device and transfer the received sensor information to the application, when receiving the signal for requesting for the sensor information of the device from the application, and wherein the device driver stores the sensor information received from the device and, when repeatedly receiving a request for the sensor information of the device from the application, transfers the stored sensor information to the application without transmitting a separate signal to the device.

A method of communication between a host of an automated teller machine and a device employs an interrupt communication scheme in which the device transmits to the host an interrupt signal for notifying the fact that a change of a sensor value occurs, in a case where the sensor value of the device is changed during a process of communication between the host constituting the automated teller machine and each of the plurality of devices that operate according to a command of the host. This employing of the interrupt communication scheme reduces the number of times that communication is repeatedly performed in short time intervals for transferring a signal between the host and the device according to sensor polling that is performed by the host to check a real-time state of the device. As a result, excessive traffic that occurs on a USB communication line between the host and the device can be effectively reduced during a process of managing the automated teller machine.

Moreover, in the method of communication between a host of an automated teller machine and a device according to the present disclosure, USB traffic that acts as a load on the automated teller machine can be effectively reduced, thereby minimizing a load applied to a communication H/W chip installed in the automated teller machine. Consequently, the frequency with which a communication failure occurs can be reduced, thereby achieving the effect of providing support for seamless communication.

DETAILED DESCRIPTION

An embodiment of the present disclosure will be described in detail below with reference to the drawings. However, the present disclosure is not limited to the embodiments described below as long as a description of the present disclosure does not depart from the gist of the present disclosure.

Figure 1:
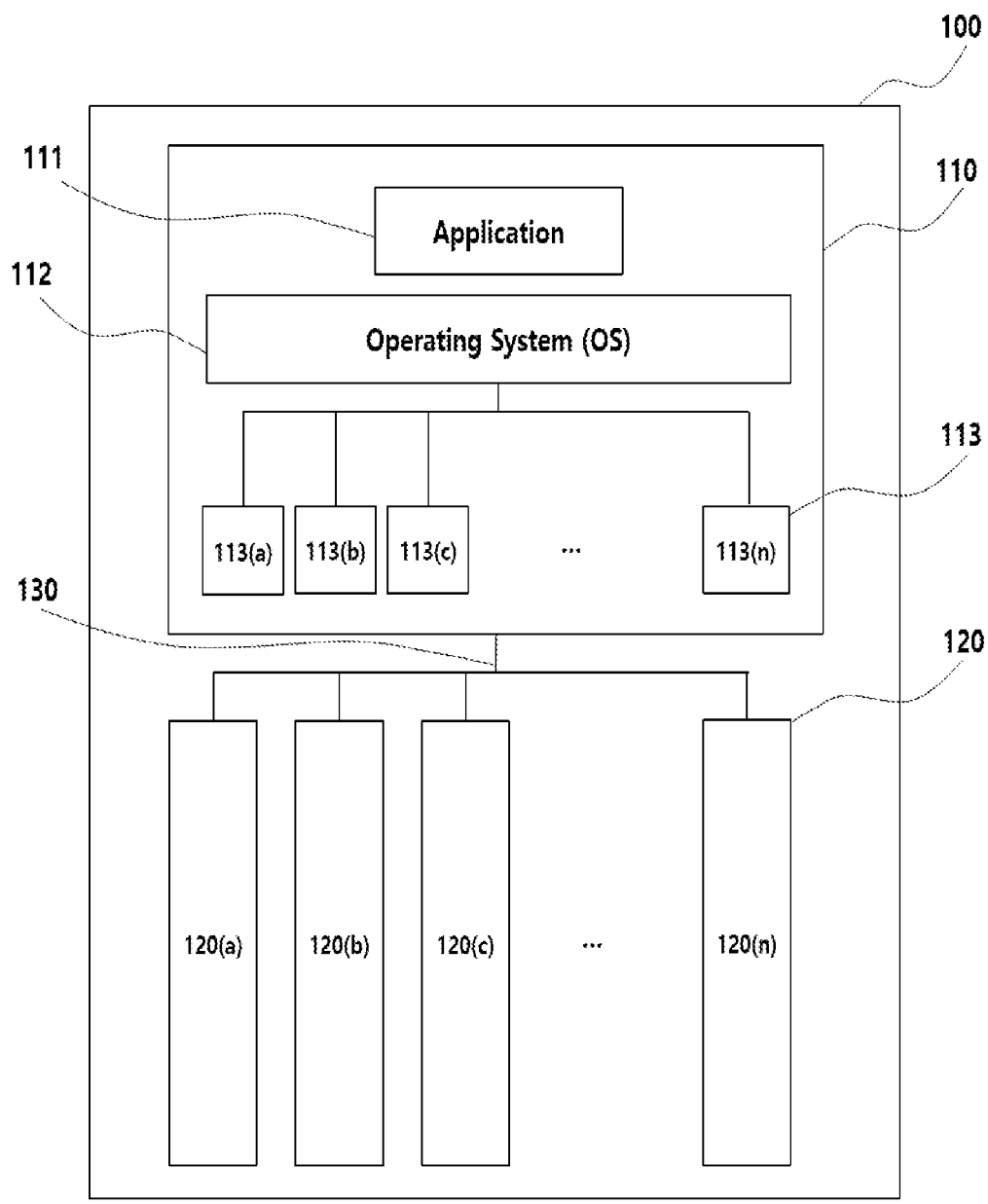
FIG. 1 is a block diagram schematically illustrating a structure signal transfer line between a host and a device that constitutes an automated teller machine.

FIG. 1 is a block diagram schematically illustrating a structure signal transfer line between a host 110 and a device 120 that constitute an automated teller machine 100.

From the structure of the signal transfer line between the host and the device in FIG. 1, it can be seen that the automated teller machine 100 may be configured to include the host 110, configured with a main CPU, and the device 120, connected to the host 110 through a USB cable 130 and operation-controlled according to a control command of the host 110.

In this case, an operating system 112 is installed on the host 110 of the automated teller machine 100. An application 111 is installed on the host 110 in order to run on the operating system 112. In addition, a multiplicity of device drivers 113 for driving a plurality of devices 120 connected to the host 110 are installed on the host 110.

In order to provide a financial service to a customer through the automated teller machine 100 with this configuration, the application 111 installed on the host 110 runs, and thus, the plurality of devices 120 is driven. At this point, the application 111 transfers a control signal to the individual device 120 through each of the device drivers 113 running on the operating system 112. The device driver 113 transmits the control signal of the application 111 to the individual device 120 through the USB cable 130.

In addition, the device 120 transmits an operating signal the device driver 113 through the USB cable 130 in response to the transmitted control signal. The transmitted operating signal is transferred to the application 111. To this end, a USB hub driver (not illustrated) is installed on the host 110. The USB hub driver is configured to gather communication signals between each of the devices 120 and the device driver 113 for driving the device 120, to transfer the gathered communication signals to the host 110 or the device 120 and to transmit the gathered communication signals to the device 120 or the device driver 113 for which the gathered communication signals are destined.

The USB communication that is performed in this manner between the host 110 and the device 120 through the USB cable 130 is broadly categorized into control and bulk communication schemes. Usually, the control communication scheme applies to execute a simple operating command and to perform an arithmetic operation, and the bulk communication scheme applies to transmit a significant amount of data. The control and bulk communication schemes will be described in more detail below with reference to FIGS. 2 and 3.

Figure 2:
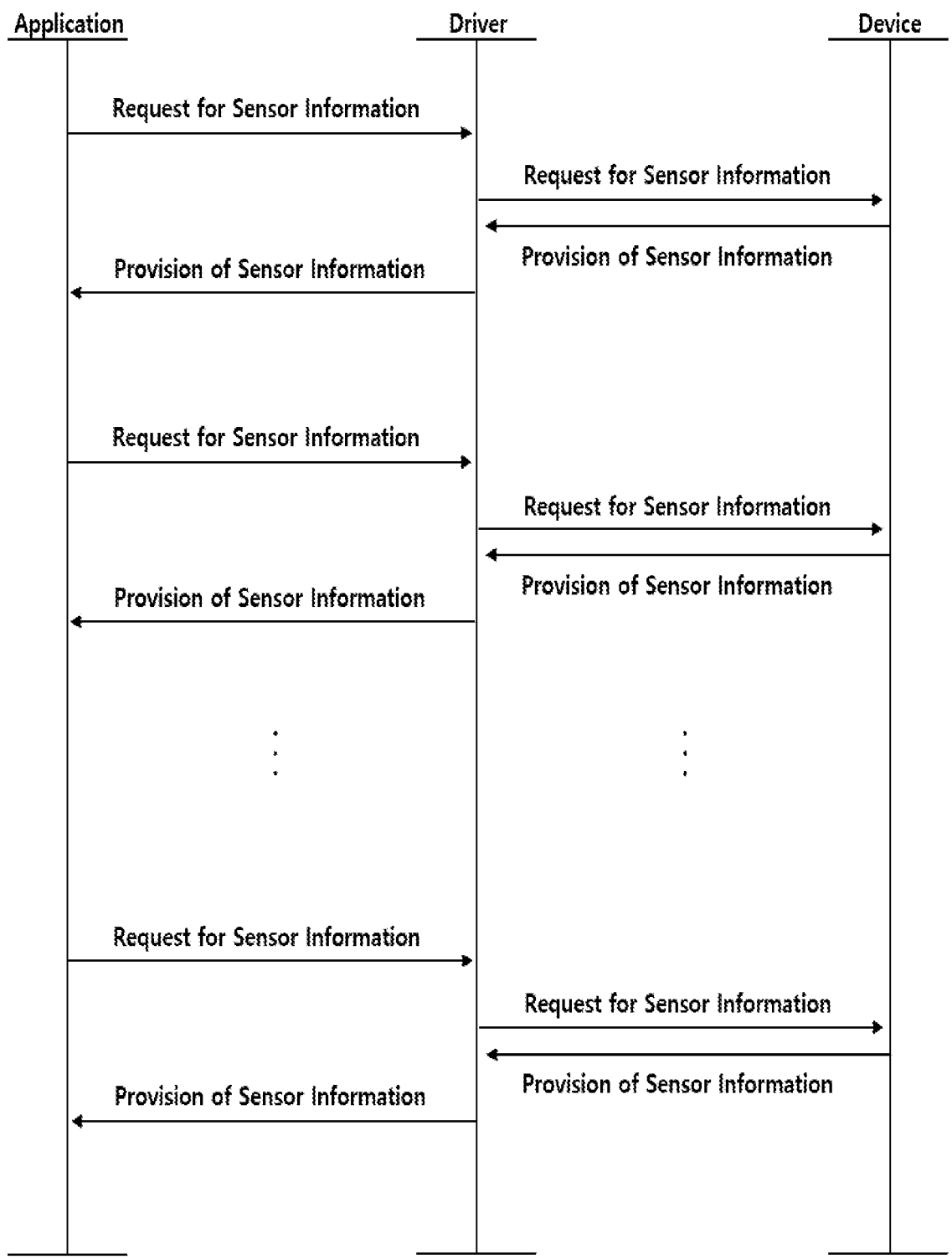
FIG. 2 is a flowchart illustrating a control communication scheme in the related art that applies in the automated teller machine.

FIG. 2 is a flowchart illustrating the control communication scheme in the related art that applies in the automated teller machine 100.

As described above, the control communication scheme applies to a communication process of transmitting a command to the device 120 of the automated teller machine 100 or checking a state of the device 120. A process of performing the control communication scheme for checking the state of the device 120 is described as follows with reference to FIG. 2.

First, the application 111 installed on the host 110 of the automated teller machine 100 makes a request to the device driver 113 for sensor information of the device 120, the device driver 113 transmits a communication signal for requesting for the sensor information of the device 120. The device 120 transmits the sensor information of the device 120 to the device driver 113 in response to the communication signal transmitted from the device driver 113. The device driver 113 transfers the sensor information of the device 120 received from the device 120 to application 111.

Through these processes, control communication between the host 110 and the device 120 is performed. As described above, the host 110 of the automated teller machine 100 has to consistently and accurately check a real-time state of the device 120 in order to conduct a seamless financial transaction through the automated teller machine 100. Thus, regardless of whether or not the device 120 operates, a state of each device 120 is set in such a manner as to be always checked. To this end, sensor polling for acquiring the sensor information of the device 120 is performed between the host 110 and the device 120.

A process of performing the sensor polling is configured in such a manner that communication for requesting and receiving the above-mentioned sensor information is periodically performed between the host 110 and the device 120. As a result, communication for requesting and receiving the sensor information of the device 120 is repeatedly performed at very short time intervals. There is a problem in that a considerable level of USB traffic occurs, frequently causing a failure of the automated teller machine 100 to communicate properly.

In addition, even when a sensor value of the device 120 is not changed, a sensor polling sequence for requesting and receiving the sensor information is performed between the device driver 113 and the device 120. Thus, communication for transferring the same signal is repeatedly performed at very short time intervals over a USB communication line between the device driver 113 and the device 120. Accordingly, there is a problem in that unnecessary USB traffic occurs.

Figure 3:
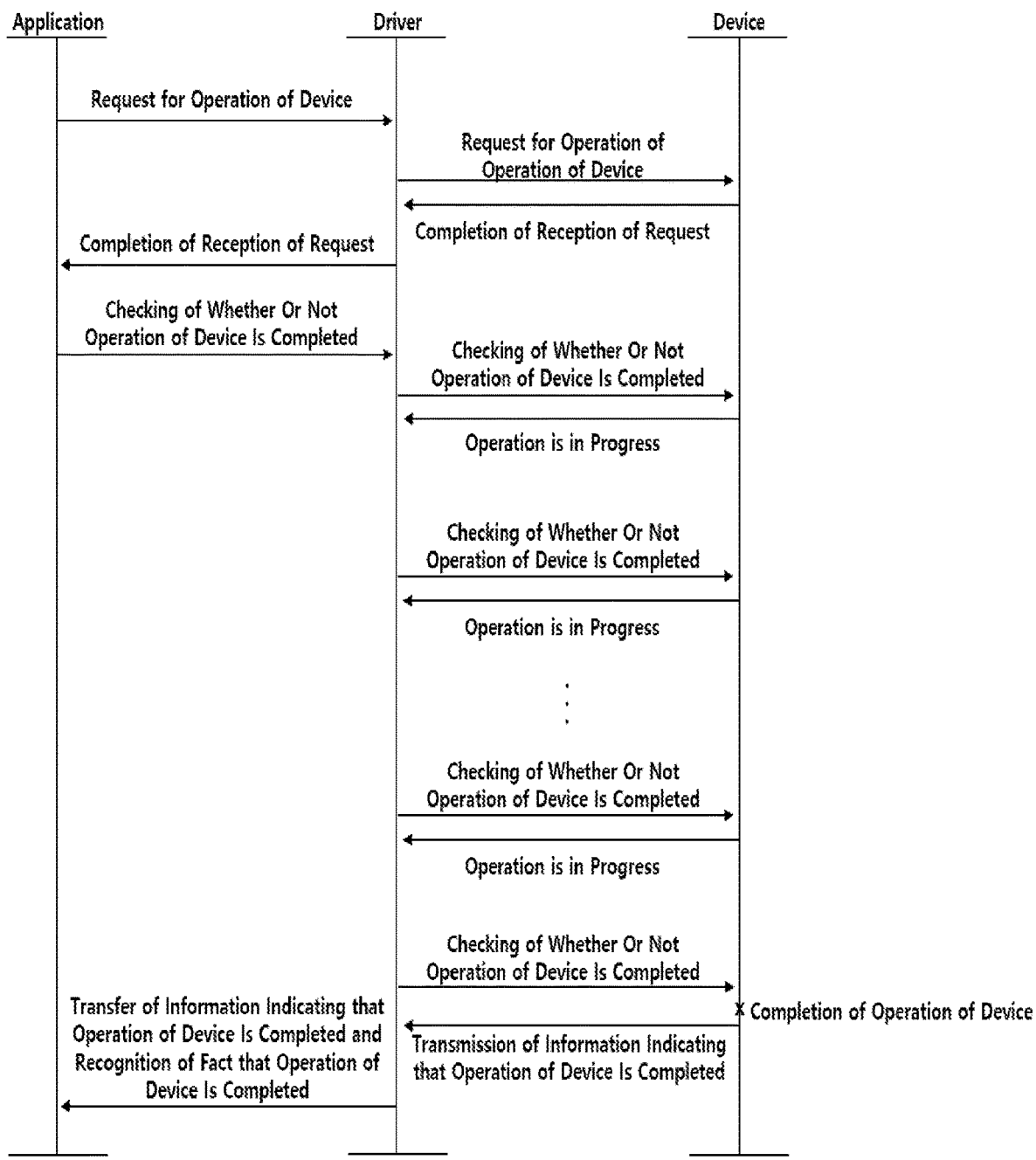
FIG. 3 is a flowchart illustrating a bulk communication scheme that applies in the automated teller machine.

FIG. 3 is a flowchart illustrating the bulk communication scheme that applies in the automated teller machine 100.

In a process of driving the automated teller machine 100, the bulk communication scheme applies to transmit the significant amount of data, such as image data. The bulk communication scheme is described as follows with reference to FIG. 3.

First, when the application 111 installed on the host 110 transfers a bulk communication signal for making a request to the device driver 113 to operate the device 120, the device driver 113 transmits to the device 120 a communication signal for requesting the device 120 to perform an operation. The application 111 receives a notification, from the device 120, indicating that the reception of the communication signal for requesting the device 120 to perform an operation is completed.

Subsequently, when the device driver 113 notifies the application 111 that the reception of the communication signal for requesting the device 120 to perform an operation is completed, the application 111 in turn transfers to the device driver 113 a communication signal for checking whether or not the operation of the device 120 is completed. The device driver 113 receives this communication signal for checking whether or not the operation of the device 120 is completed and then transmits the received communication signal to the device 120. Thereafter, the process of communication is performed in a manner similar to the sensor polling between the device driver 113 and the device 120 that is described with reference to FIG. 2.

In a case where the operation of the device 120 is not yet completely performed, the device 120 receives the communication signal, transmitted by the device driver 113, for checking whether or not the operation of the device 120 is completed, but transmits to the device driver 113 a communication signal indicating that the device 120 currently performs the operation.

Subsequently, in the process of communication between the device driver 113 and the device 120, as described above, the communication signal for checking whether or not the operation of the device 120 is completed and the communication signal indicating that the device 120 currently performs the operation are repeatedly transmitted and received until the device 120 transmits information indicating that the operation of the device 120 is completed, to the device driver 113. When the same communication signal periodically occurs at short time intervals in this manner, a significantly heavy load is applied to the USB communication line.

After the operation of the device 120 is completed, the device 120 transmits to the device driver 113 the information indicating that the operation of the device 120 is completed. Subsequently, the device driver 113 transfers the information indicating that the operation of the device 120 is completed, to the application 111. Thus, the application 111 knowledges that the operation of the device 120 is completed, and the process of communication between the host 110 and the device 120 is completed.

That is, in the case of the bulk communication scheme, like in the case of the control communication scheme, the communication signals for checking whether or not the operation of the device 120 is performed are also repeatedly transmitted and received at short time intervals between the device driver 113 and the device 120. This also serves as a factor in increasing the bulk USB traffic in the process of communication between the host 110 and the device 120.

At this point, the significant amount of data, including image data of itemized accounts that occur during financial transactions through the automated teller machine 100 and scanned image data of customer information, is transmitted in the bulk communication scheme. The bulk communication scheme mostly applies during a process of financial transaction, such as withdrawal, that involves transmission of these significant amounts of data.

That is, as described with reference to FIGS. 2 and 3, in the control communication scheme or the bulk communication scheme that applies between the host 110 and the device 120 of the automated teller machine 100 in the related art, the same signal is repeatedly transmitted and received at short time intervals, even when there is no significant change of the sensor information of the device 120. Thus, excessive traffic occurs in the USB communication line. Accordingly, there is a problem in that a significant load is applied to a communication H/W chip, installed in the automated teller machine 100, that is utilized during the process of USB communication between the host 110 and the device 120.

In the related art, in this manner, even when there is no change of a state of the device 120, the transmission of the communication signal containing the same information is repeatedly performed between the host 110 and the device 120. Thus, a USB communication load is excessively applied to a communication line over which the communication signal is transmitted. In order to reduce the USB communication load, according to the present disclosure, a hybrid interrupt communication scheme is employed. The hybrid interrupt communication scheme is configured in such a manner that, only when there is a change of the sensor value of the device 120, an interrupt signal indicating an occurrence of the change of the sensor value is transmitted from the device 120 to the host 110. Furthermore, the hybrid interrupt communication scheme is configured in such a manner that mutual communication between the host 110 and the device 120 of the automated teller machine 100 is performed on the basis of the interrupt signal. The hybrid interrupt communication scheme according to the present disclosure is in more detail described with respect to the FIGS. 4 and 5.

Figure 4:
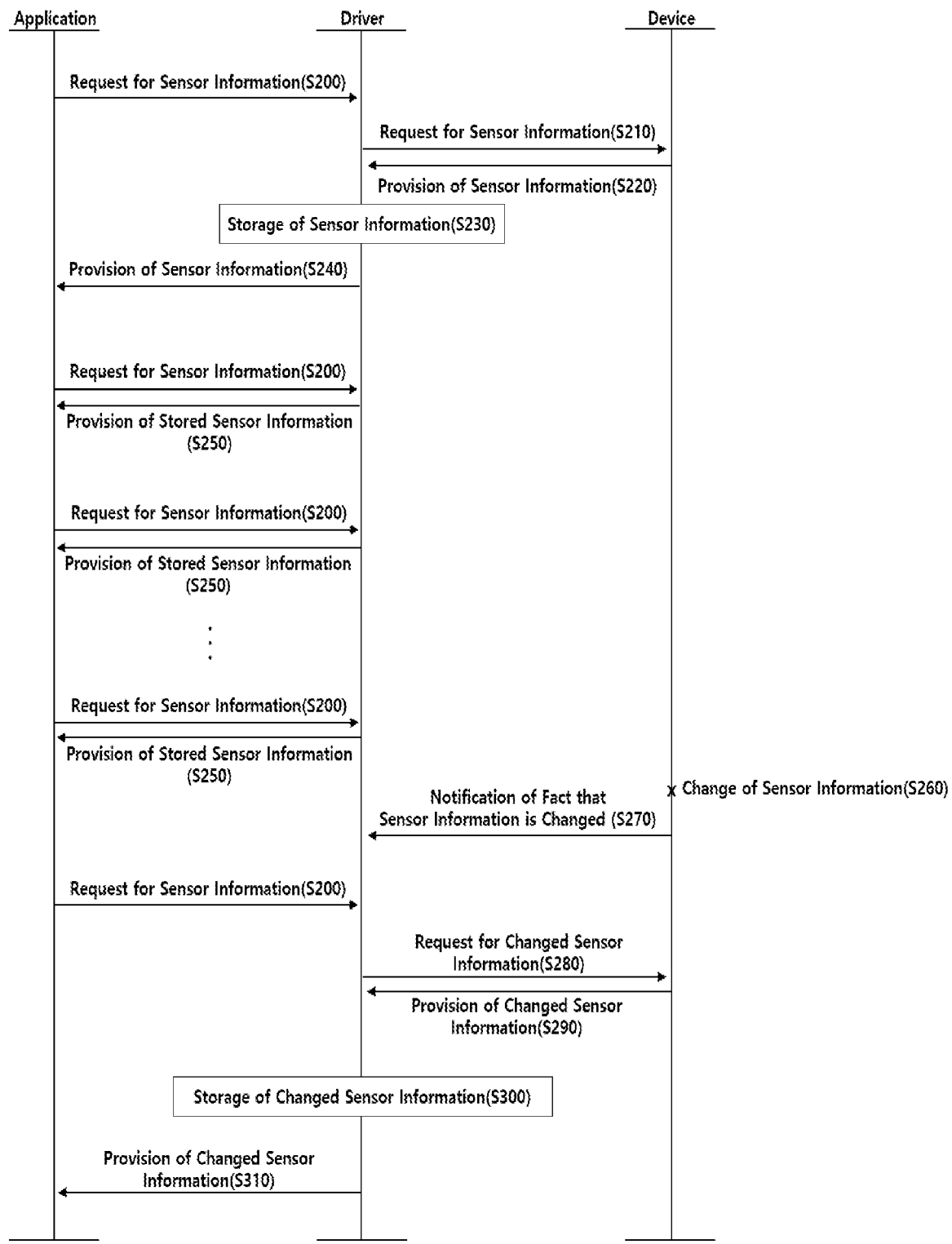
FIG. 4 is a flowchart illustrating an example of a hybrid interrupt communication scheme according to an embodiment of the present disclosure.
Figure 5:
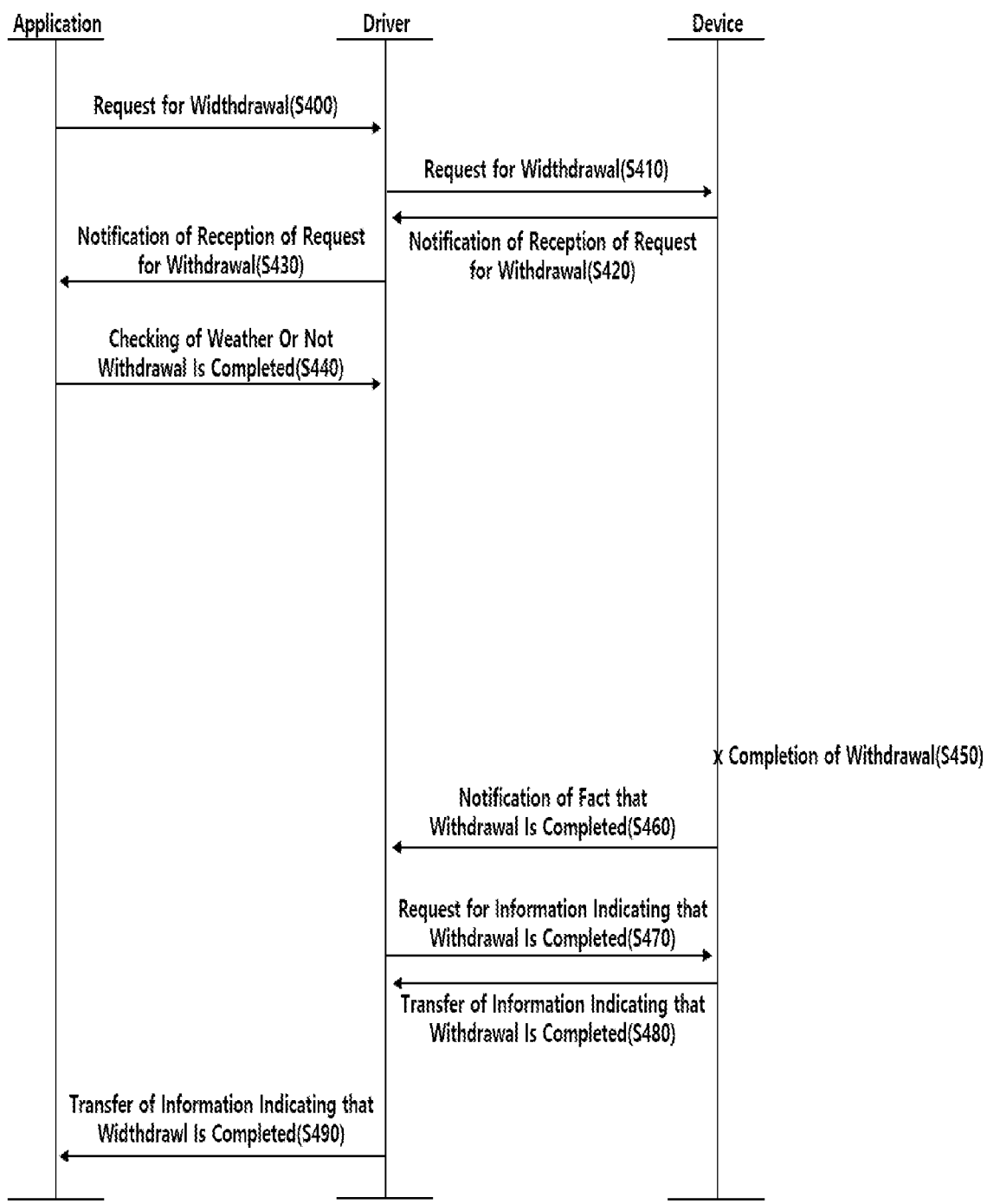
FIG. 5 is a flowchart illustrating an example of a process of communication that is performed during a process of withdrawal through a hybrid interrupt communication scheme according to another embodiment of the present disclosure.

FIGS. 4 and 5 are flowcharts each illustrating an example of the hybrid interrupt communication scheme according to the present disclosure.

FIG. 4 is a flowchart illustrating a hybrid interrupt communication scheme according to an embodiment of the present disclosure that is improved by applying the interrupt communication according to the present disclosure to the control communication scheme.

The hybrid interrupt communication scheme according to the embodiment of the present disclosure, which results from applying the interrupt communication scheme to the control communication scheme for checking the state of the device 120 is described as follows with reference to FIG. 4.

First, when the application 111 installed on the automated teller machine 100 makes a request to the device driver 113 for the sensor information of the individual device 120 that operates in unison with the application 111 (S200), the device driver 113 transmits to the individual device 120 a communication signal for requesting for the sensor information of the device 120 (S210). Each device 120 provides the sensor information of the device 120 to the device driver 113 in response to the communication signal transmitted from the device driver 113 (S220).

Subsequently, the device driver 113 stores the sensor information of the device 120 provided from the individual device 120 (S230) and provides the stored sensor information of the device 120 to the application 111 that runs in unison with each device 120 (S240).

At this point, the sensor information of the device 120 may be stored in a cash within the automated teller machine 100 by the device driver 113 and provided to the application 111. When a new sensor information indicating a change arrives from the device 120, the existing sensor information may be updated with the new sensor information, and the new sensor information may be stored.

Subsequently, when the application 111 makes a request to the device driver 113 for the sensor information (S200), the device driver 113 performs a step S250 of providing the prestored sensor information to the application 111 instead of performing a step of making a request to the individual device, operating in unison with the application 111, for the sensor information.

This process of requesting for the sensor information between the application 111 and the device driver 113 and providing the stored sensor information is repeatedly performed before until the device driver 113 is notified by the interrupt signal from the device 120 that the sensor information of the device 120 is changed.

At this point, in a case where the sensor information of the device 120 is changed (S260), with the interrupt signal, the device 120 notifies the device driver 113 of the fact that the sensor information is changed (S270).

Subsequently, when the communication signal in the sensor information requesting step S200 in which the application 111 periodically requests for the sensor information for the sensor polling is transferred to the device driver 113, the device driver 113, which is notified by the device 120 of the above-mentioned interrupt signal, makes a request to the device 120 for the changed sensor information of the device 120 (S280) and the device 120 provides the changed sensor information to the device driver 113 (S290). Accordingly, the device driver 113 acquires the changed sensor information of the device 120 and stores the acquired changed sensor information of the device 120 (S300). Furthermore, the device driver 113 executes a procedure for providing the stored sensor information of the device 120 (S310).

In this manner, in the hybrid interrupt communication scheme according to the embodiment of the present disclosure, the device driver 113 is configured to store the sensor information of the device 120 received from the device 120. Thus, if the sensor information of the device 120 is not changed, when the request for the sensor information of the device 120 is transferred from the application 111 to the device driver 113, for the sensor polling, the device driver 113 repeatedly performs a process of providing the sensor information of the device 120 to the application 111.

When the sensor information of the device 120 is changed, with the interrupt signal, the device 120 promptly notifies the device driver 113 of the fact that the sensor information of the device 120 is changed. Thus, the device driver 113 recognizes a change of the sensor information of the device 120 on the basis of the notification of the fact that the sensor information is changed. After the device 120 notifies the device driver 113 of the fact that the sensor information of the device 120 is changed, when the application 111 makes a request to the device driver 113 for the sensor information of the device 120 for the sensor polling, the device driver 113 makes a request to the device 120 for the changed sensor information of the device 120, and the device driver 113 transmits the changed sensor information. Then, the device driver 113 stores the changed sensor information of the device 120, which is transmitted from the device 120 and transfers the stored sensor information of the device 120 to the application 111. Thus, the process of transmitting and receiving the same signal that is unnecessarily performed even when there is no change of the sensor information of the device 120 is omitted from the process of communication between the host 110 and the device 120 in the related art. Accordingly, the load that is applied to the USB communication line can be effectively reduced.

In addition, a hybrid interrupt communication scheme according to another embodiment of the present disclosure, which results from applying the interrupt communication scheme to the bulk communication scheme for transmitting the significant amount of data, is described with reference to FIG. 5.

FIG. 5 is a flowchart illustrating an example of the process of communication that is performed during a process of withdrawal through the hybrid interrupt communication scheme according to another embodiment of the preset disclosure. The hybrid interrupt communication scheme is described as follows with reference to FIG. 5.

During the process of withdrawal in which the significant amount of data, such as image data of itemized accounts, is transmitted, when the application 111 installed on the host of the automated teller machine 100 makes a request to the device driver 113 for the withdrawal (S400), the device driver 113 transmits a communication signal for requesting for performing an operation of the withdrawal to the individual device 120 (S410), and the device 120 notifies the device driver 113 that the communication signal for requesting for performing the operation of the withdrawal is received (S420).

Subsequently, the device driver 113 notifies the application 111, which requests for the withdrawal, that the request for the withdrawal is received in the device 120 (S430). Then, the application 111 transmits to the device driver 113 a signal for checking whether or not the operation of the device 120 that is performed in unison with the application 111 is completed (S440).

At this point, the hybrid communication scheme according to the present disclosure is configured in such a manner that, when there is a change of the sensor information of the device 120, the device 120 notifies the device driver 113 of the fact that the sensor information is changed, using the interrupt signal. Thus, the device driver 113 determines that the operation of the withdrawal by the device 120 is not completed, before until the device 120 separately notifies that the sensor information of the device 120 is changed, and remains in a waiting state. When the operation of the withdrawal by the device 120 is completed (S450), since a change occurs in the sensor information of the device 120, the device 120 transmits to the device driver 113 the interrupt signal for notifying the fact that the operation of the withdrawal is completed (S460). After receiving through the above-mentioned interrupt signal the notification that the operation of the withdrawal is completed, the device driver 113 makes a request to the device 120 for information indicating that the operation of the withdrawal is completed (S470). When the information indicating that the operation of the withdrawal is completed is transmitted from the device 120 (S480), the device driver 113 transfers to the application 111 the transmitted information indicating that the operation of the withdrawal is completed (S490).

In this manner, in the process of communication in which the hybrid communication scheme according to the present disclosure is employed, the process can be omitted in which the communication signal is unnecessarily transmitted and received at short time intervals between the device driver 113 and the device 120 in order to check whether or not the operation of the device 120 in the related art is completed. As a result, the bulk USB traffic that occurs on the USB communication line between the host 110 and the device 120 can be effectively reduced.

A financial transaction that employs a hybrid interrupt communication method as illustrated in FIG. 5 refers to a financial transaction involving the transmission of the significant amount of data, such as image data of itemized accounts and scanned image data of customer information. Examples of financial transactions may include deposit and withdrawal transactions or financial transactions that involve image scanning.

An amount of communication traffic between the host 110 and the device 120 was measured when employing the hybrid interrupt communication according to the present disclosure. The result was that the USB communication load was reduced by 95% or more compared with the control and bulk communication schemes in the related art. Accordingly, a load can be reduced that is applied to the communication H/W chip, installed in the automated teller machine 100, that is utilized in the process of USB communication between the host 110 and the device 120. Furthermore, the frequency with which a communication failure occurs can be reduced, thereby achieving the effect of providing support for seamless communication.

Moreover, in the hybrid interrupt communication method according to the present disclosure, when an event occurs such as a change of the sensor value of the device 120 and/or completion of performing of the device 120, as described above, the device 120 performs a step of transmitting to the device driver 113 a signal indicating the fact that the sensor information is changed or transmitting through the interrupt signal a signal indicating the fact that the operation of the device 120 is completed. While this step is performed, using an identifier, the device 120 may check whether the changed sensor information of the device 120 needs to be transmitted through the control communication scheme or the bulk communication scheme and may transmit the changed sensor information of the device 120 to the device driver 113 through the corresponding communication scheme.

The present disclosure is not limited to the above-described embodiments and the accompanying drawings. It would be apparent to a person of ordinary skill in the art to which the present disclosure pertains that various substitutions, alterations, and modifications are possible within the scope that does not depart from the technical idea of the present disclosure.

A method of communication between a host of an automated teller machine and a device according to the present disclosure can simplify a process of repeatedly transmitting and receiving the same signal between the host of the automated teller machine and the device, in association with setting-up of a scheme for communication between the host made up of a main CPU and a plurality of the devices that operate according to a control command of the host. The process has to be performed as a result of sensor polling which the host periodically performs to check a state of a device. The process is simplified by employing an interrupt communication scheme in which an interrupt signal for notifying that a change of a sensor value occurs in the device is transmitted from a device to a host. This simplification reduces USB traffic that occurs during a process of communication between the host of the automated teller machine and the device, thereby reducing a load that is applied to a communication H/W chip of the automated teller machine. Consequently, the frequency with which a communication failure occurs is reduced, thereby achieving the effect of providing support for seamless communication.

What is claimed is:

1. A method of communication for transmission of data between a host in an automated teller machine, the host on which an application for conducting a financial transaction is installed and on which a device driver for driving a multiplicity of devices in which the financial transaction is conducted is installed, and each of the multiple of devices connected to the host through a USB communication line,
   wherein the device driver is configured in such a manner as to transmit a signal for requesting for sensor information of the device to the device over the USB communication line, receive the sensor information from the device and transfer the received sensor information to the application, when receiving the signal for requesting for the sensor information of the device from the application, and
   wherein the device driver stores the sensor information received from the device and, when repeatedly receiving a request for the sensor information of the device from the application, transfers the stored sensor information to the application without transmitting a separate signal to the device.

2. The method of claim 1, wherein, in a case where the sensor information that is retained by the device is changed, the device transmits to the device driver an interrupt signal for notifying that the sensor information is changed, and
   wherein, when receiving a signal for requesting for the sensor information of the device from the application, the device driver receiving the interrupt signal transmits a signal for requesting for the changed sensor information of the device to the device over the USB communication line, receives the changed sensor information from the device and transfers the received changed sensor information to the application, and updates the stored sensor information with the changed sensor information and stores the changed sensor information.

3. The method of claim 1, wherein the device driver stores the sensor information, received from the device, in a cache.

4. A method of communication for transmission of data between a host in an automated teller machine, the host on which an application for conducting a financial transaction is installed and on which a device driver for driving a multiplicity of devices in which the financial transaction is conducted is installed, and each of the multiple of devices connected to the host through a USB communication line,
   wherein the device driver is configured to transmit a signal for requesting for operation of the device to the device over the USB communication line, receive from the device a notification that the request for the operation of the device is received and transfer the received notification to the application, when receiving a bulk signal for requesting for operation of the device from the application, and wherein the device driver is configured to transmit to the device a signal for requesting for information indicating that the operation of the device is completed, receive from the device the information indicating that the operation of the device is completed and transfer the received information to the application, when subsequently receiving from the application a signal for requesting for checking of whether or not the operation of the device is completed.

5. The method of claim 4, wherein the device is configured to transmit to the device driver an interrupt signal for notifying that the operation of the device is completed, when completing the requested operation of the device, and wherein the device driver is configured to transmit to the device a signal for requesting for the information indicating that the operation of the device is completed, after receiving the interrupt signal from the device.

6. The method of claim 4, wherein the operation of the device that is requested for with the bulk signal includes deposit and withdrawal transitions or image scanning.

* * * * *